United States Patent
Xi

(10) Patent No.: US 8,145,441 B2
(45) Date of Patent: Mar. 27, 2012

(54) PORTABLE ELECTRONIC APPARATUS FOR COLLECTING IMPACT INFORMATION

(75) Inventor: Qing Xi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 425 days.

(21) Appl. No.: 12/491,397

(22) Filed: Jun. 25, 2009

(65) Prior Publication Data
US 2010/0030494 A1 Feb. 4, 2010

(30) Foreign Application Priority Data
Jul. 31, 2008 (CN) .......................... 2008 1 0303263

(51) Int. Cl.
*G01L 5/00* (2006.01)
*G06F 19/00* (2011.01)

(52) U.S. Cl. .................. 702/41; 73/579; 360/75; 702/46
(58) Field of Classification Search .................. 702/36, 702/38, 41, 46, 56, 150; 73/170.17, 379.05, 73/579; 340/541, 550, 627, 632; 701/28, 701/29, 3; 360/75
See application file for complete search history.

(56) References Cited

U.S. PATENT DOCUMENTS

| 7,872,827 | B2* | 1/2011 | Shu et al. ................... 360/75 |
| 2008/0061969 | A1* | 3/2008 | Okude et al. .............. 340/541 |
| 2010/0326192 | A1* | 12/2010 | Petelenz et al. ............ 73/579 |

* cited by examiner

*Primary Examiner* — John H Le
(74) *Attorney, Agent, or Firm* — Altis Law Group, Inc.

(57) ABSTRACT

A portable electronic apparatus for collecting impact information includes a body, a piezoelectric element, a processing element, and a storage element. The piezoelectric element covers the body and generates an electrical signal when experiencing a force from an impact. The processing element, connected to the piezoelectric element, converts the electrical signal from the piezoelectric element into impact information. The storage element stores the impact information.

9 Claims, 2 Drawing Sheets

PORTABLE ELECTRONIC APPARATUS FOR COLLECTING IMPACT INFORMATION

BACKGROUND

1. Technical Field

The disclosure relates to a portable electronic apparatus and, more particularly, to a portable electronic apparatus that can collect impact information.

2. Description of the Related Art

Nowadays, electronic devices, such as mobile phones and media players, have become smaller and smaller, and is likely to be dropped. When a small electronic device is dropped, faults may occur in the device due to the impact from being dropped. However, a service person, who does not know what has happened to the small electronic device, may have difficulty troubleshooting and repairing the electronic device.

BRIEF DESCRIPTION OF THE DRAWINGS

The components in the drawings are not necessarily drawn to scale, the emphasis instead being placed upon clearly illustrating the principles of the portable electronic apparatus for collecting impact information. Moreover, in the drawings, like reference numerals designate corresponding parts throughout the several views.

DETAILED DESCRIPTION

Figure 1:
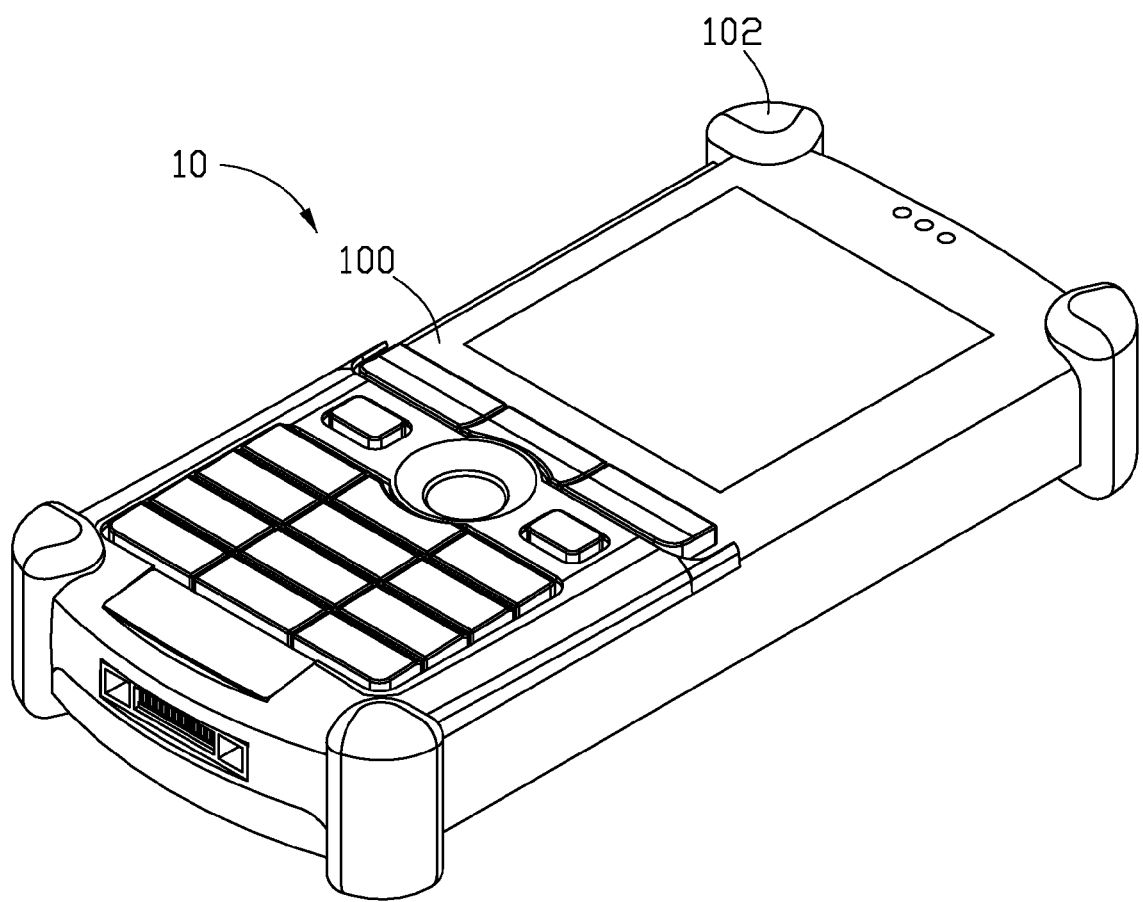
FIG. 1 is a perspective view of a portable electronic apparatus for collecting impact information in accordance with an embodiment.

FIG. 1 is a perspective view of a portable electronic apparatus for collecting impact information in accordance with an embodiment. The portable electronic apparatus 10 for collecting impact information (hereinafter "the portable apparatus") includes a body 100 and a cushion element 102. In this embodiment, the cushion element 102 includes four cushion portions, and the body 100 is a rectangular prism with four pairs of corners. Each cushion portion of the cushion element 102 is made of an elastic material and covers the surfaces of each pair of corners of the body 100. It may be understood that the body of the portable apparatus may be another shape, such as a circular prism, or an elliptical prism.

Figure 2:
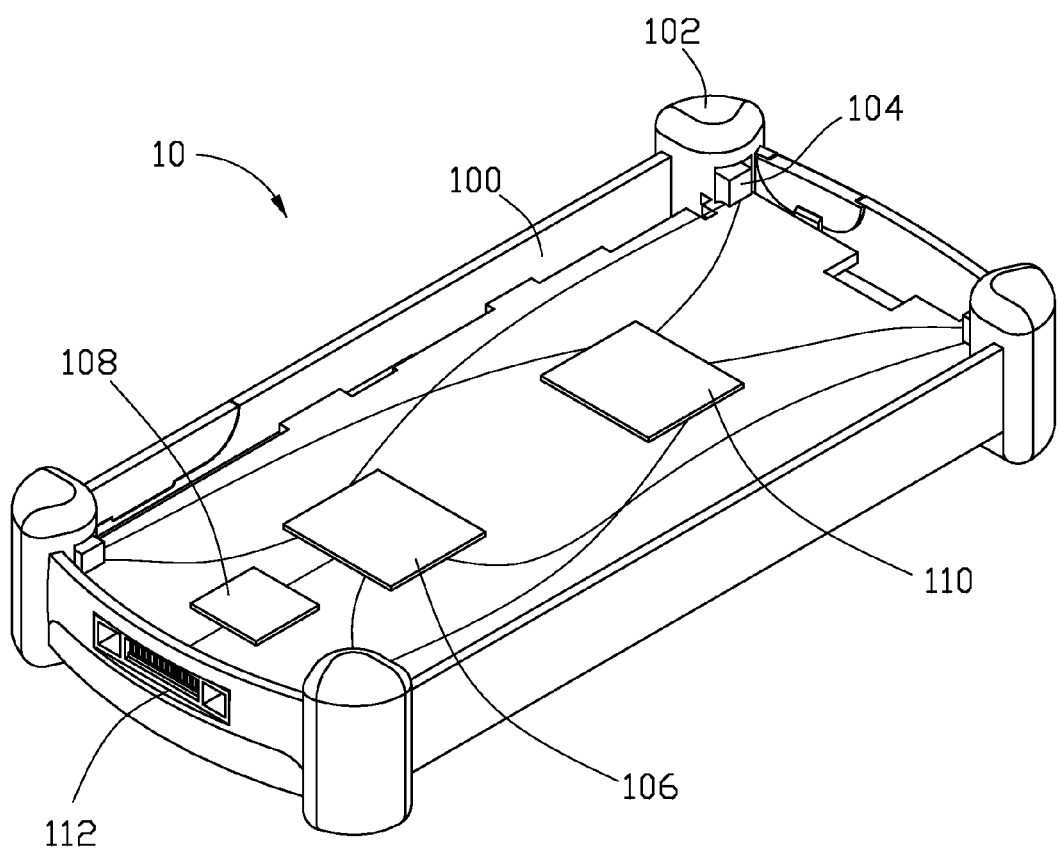
FIG. 2 is a perspective view of an internal structure of the portable electronic apparatus of FIG. 1.

FIG. 2 is a perspective view of an internal structure of the portable electronic apparatus of FIG. 1. A piezoelectric element 104 is sandwiched between each cushion portion of the cushion element 102 and the surfaces of the portable apparatus 10. The piezoelectric elements 104 are configured for generating electrical signals when the corresponding cushion portion of the cushion element 102 experiences a force such as an impact due to being dropped, and transfers the force to the piezoelectric element 104. The electrical signals may be voltage or current signals. The body 100 of the portable apparatus 10 includes a processing element 106, a storage element 108, an alarm element 110, and an output element 112. The processing element 106 is connected to the piezoelectric elements 104, and is configured for converting the electrical signals from the piezoelectric elements 104 into impact information and storing the impact information in the storage element 108.

In this embodiment, the impact information includes impact location (e.g., cushion element 102), the number of impacts corresponding to each impacted location, and impact intensity corresponding to each impact location. The processing element 106 distinguishes impact locations by distinguishing which of the piezoelectric elements 104 has generated the electrical signal. Generally, a piezoelectric element 104 generating an electrical signal represents an impact occurring in the cushion element 102 covering the piezoelectric element 104 or on regions adjacent to the piezoelectric element 104. The processing element 106 counts the number of impacts corresponding to each impacted location by counting the number of the electrical signals received from the corresponding piezoelectric element 104. The impact intensity corresponding to each impact is determined according to an amount of the voltage or current of the electrical signal from the piezoelectric element 104.

The alarm element 110 is also connected to the piezoelectric elements 104, and is configured for generating an alarm signal to produce, for example, an audible and/or visual alarm when receiving an electrical signal from any of the piezoelectric elements 104. In another embodiment, the alarm element 110 is connected to the processing element 106 and the processing element 106 controls the alarm element 110 to generate the alarm signal when receiving an electrical signal from any of the piezoelectric elements 104 including any other desired predetermined parameters such as an impact surpassing a minimum threshold. The output element 112 is connected to the processing element 106 and is configured to output the impact information in the storage element 108, so that a service person can determine possible impact caused faults in the portable apparatus 10 according to the impact information in the storage element 108. In this embodiment, the output element 112 is an output interface. In another embodiment, the output element may be a display for displaying the impact information.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A portable electronic apparatus for collecting impact information, comprising:
   a body;
   at least one piezoelectric element covering the body and generating an electrical signal when experiencing a force from an impact;
   a processing element, connected to the at least one piezoelectric element, converting the electrical signal from the at least one piezoelectric element into impact information; and
   a storage element storing the impact information;
   wherein the impact information comprises impact locations and the number of impacts corresponding to each impacted location, the processing element is further configured to distinguish the impact locations by distinguishing which of the at least one piezoelectric element has generated the electrical signal and count the number of impacts by counting the number of the electrical signals received from the corresponding piezoelectric element.

2. The portable electronic apparatus as recited in claim 1, wherein the electrical signal is a voltage or a current signal.

3. The portable electronic apparatus as recited in claim 1, further comprising a cushion element covering the surfaces of the body, the cushion element being made of an elastic material, wherein the piezoelectric element is sandwiched between the cushion element and the surfaces of the body.

4. The portable electronic apparatus as recited in claim 3, wherein when the cushion element experiences the force of an impact and transfers the force to the piezoelectric element, the piezoelectric element generates the electrical signal.

5. The portable electronic apparatus as recited in claim 3, wherein the body is a rectangular prism having four pairs of corners; the cushion element comprises four cushion portions covering the surfaces of the corners of the body.

6. The portable electronic apparatus as recited in claim 1, further comprising:
    an alarm element generating an alarm signal when receiving the electrical signal from the piezoelectric element.

7. The portable electronic apparatus as recited in claim 1, further comprising:
    an output element connected to the processing element, outputting the impact information in the storage element.

8. The portable electronic apparatus as recited in claim 7, wherein the output element is an output interface.

9. The portable electronic apparatus as recited in claim 7, wherein the output element is a display displaying the impact information.

* * * * *